Jan. 20, 1959 W. F. BILLINGSLEY ET AL 2,869,609
PNEUMATIC TIRE TREADS
Filed June 3, 1954

INVENTORS
WILLIAM F. BILLINGSLEY
JAMES K. BALZHISER
BY
W. A. Shira, Jr.
ATTY.

United States Patent Office 2,869,609
Patented Jan. 20, 1959

2,869,609

PNEUMATIC TIRE TREADS

William F. Billingsley, Silver Lake, and James K. Balzhiser, Cuyahoga Falls, Ohio, assignors to The B. F. Goodrich Company, New York, N. Y., a corporation of New York Application June 3, 1954, Serial No. 434,108

13 Claims. (Cl. 152—209)

This invention relates to pneumatic tires for vehicles and, more particularly, to an improved carcass and tread for such tires.

The resistance of a pneumatic tire on a vehicle to deformation under laterally directed forces, commonly referred to as stability, is an important property with respect to ease of control and safety of operation of the vehicle. Thus, the tires must have sufficient lateral stability to resist "roll over" on curves and to provide adequate "cornering power," i. e., ability to direct the vehicle in a path at an angle to the path of inertia. This stability is, in part, dependent upon the nature of the tread pattern and, in part, upon the construction of the carcass of the tire. For example, a tread pattern having tread elements of small surface dimensions separated by wide and deep grooves produces excessive lateral flexing of the elements and, hence, poor stability. While making the grooves shallower and the surface dimensions of the tread elements larger, reduces the lateral flexure, thus improving wear and stability, this is achieved at the cost of reduction in radial flexure and road adhesion. It is also known that relatively high stability can be achieved by employing a low cord angle in the carcass; that is, by constructing the tire so that the angle between the longitudinal center line of the tire and the cords employed in the plies, and/or in the breaker strip, is in the order of 30° to 37°. However, stability achieved in this manner is gained at the cost of a reduction in radial flexure or cushioning action of the tire with the result that a tire so constructed is stiff and rides hard, a feature which designers of modern vehicles are attempting to reduce. Higher cord angles in the tires increase the cushioning action, thus providing a softer ride, but at the sacrifice of lateral stability so that the steering mechanism of a vehicle so equipped is less responsive and curves must be negotiated at lower speeds.

The principal object of this invention is to provide an improved pneumatic tire construction wherein good stability is achieved without reduction of cushioning action or road adhesion.

Another object of the invention is the provision of an improved pneumatic tire construction wherein radial flexure is improved and satisfactory rigidity to lateral deflecting forces is preserved, so that a vehicle equipped with such tires provides a softer ride than when equipped with conventional tires and this is achieved without loss of desirable steering and curve taking characteristics.

A further object of the invention is to provide a tire construction which is radially flexible, but has improved resistance to lateral deflection by virtue of having the tread thereof formed of laterally spaced circumferentially extending elements constituting ribs with grooves therebetween and with the said elements or ribs having circumferentially spaced portions extending laterally therefrom adjacent the ground engaging surfaces thereof to provide lateral reinforcement for adjacent ribs.

An additional object of the invention is to improve the lateral stability of a pneumatic tire by providing an improved tread wherein a plurality of laterally spaced circumferentially extending tread elements constitute ribs with grooves therebetween with at least some of the ribs provided with circumferentially spaced portions extending laterally therefrom toward the adjacent rib and approximately into contact therewith adjacent the ground engaging surface of the ribs, and wherein the sidewall of a rib is relieved on an incline in the region of each projecting portion so that the width of a groove between adjacent ribs is not narrowed in the region of the bases of the said projecting portions.

A still further object of the invention is to improve the lateral stability of a pneumatic tire by providing an improved tread wherein a plurality of laterally spaced circumferentially extending tread elements, constituting ribs with grooves therebetween, have at least some of the elements provided with circumferentially spaced portions projecting laterally from a sidewall thereof toward the sidewall of an element on the other side of the groove therebetween and approximately into contact therewith, adjacent the ground engaging surfaces of the elements, with the sidewall of each of the projecting portions being inclined toward the element from which it projects and merging therewith adjacent to but spaced from the base thereof so that the width of the grooves are not narrowed adjacent their bottoms by the said projecting portions.

Another object of the invention is to provide an improved tire construction wherein radial flexure or cushioning action is improved by employing higher than conventional cord angles in the carcass, and lateral stability is afforded by providing at least same of the circumferentially extending tread elements with circumferentially spaced projections extending laterally toward adjacent tread elements and contacting the latter under the application of load to the tire so as to strengthen the elements against lateral deflection without loss of radial flexibility of the tire.

The invention further resides in certain novel features of the construction and arrangement of parts of the several portions of a vehicle tire, and further objects and advantages of the invention will be apparent to those skilled in the art to which it pertains from the following description of the presently preferred embodiment described with reference to the accompanying drawings, forming a part of this application, and in which.

Figure 1:
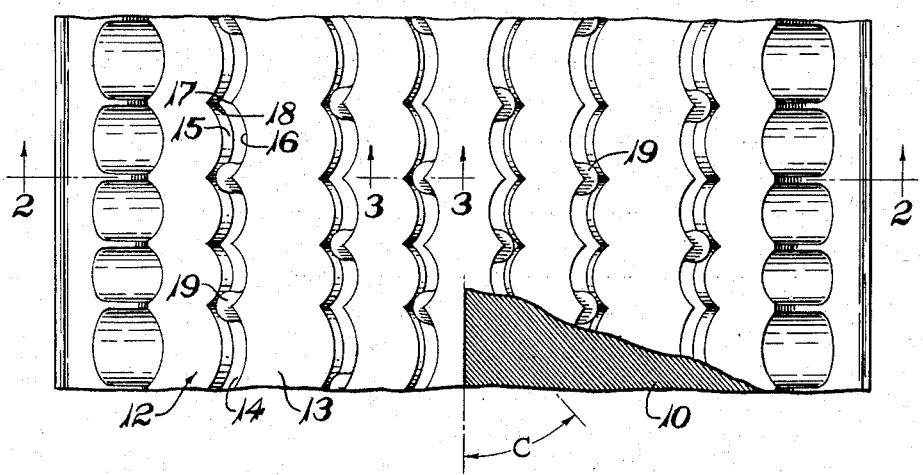
Fig. 1 is a fragmentary view of a portion of the periphery of a tire incorporating the invention, the view being principally in top elevation, but with a portion of the tread broken away to expose some of the ply cords.
Figure 2:
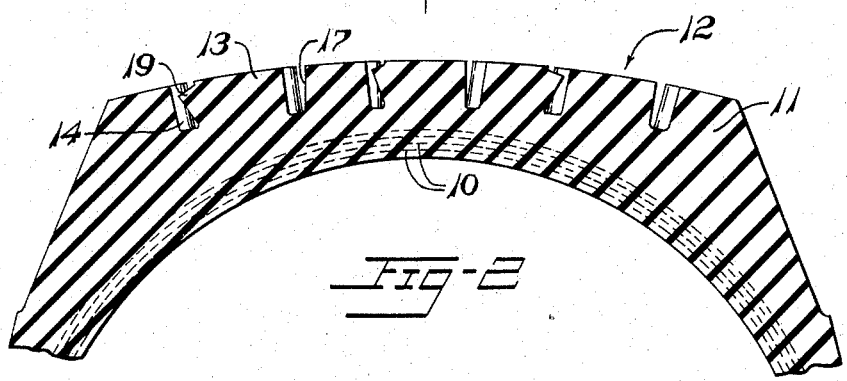
Fig. 2 is a fragmentary transverse sectional view of the tire shown in Fig. 1, the view being taken substantially on the section indicating line 2—2 of Fig. 1.
Figures 3, 4:
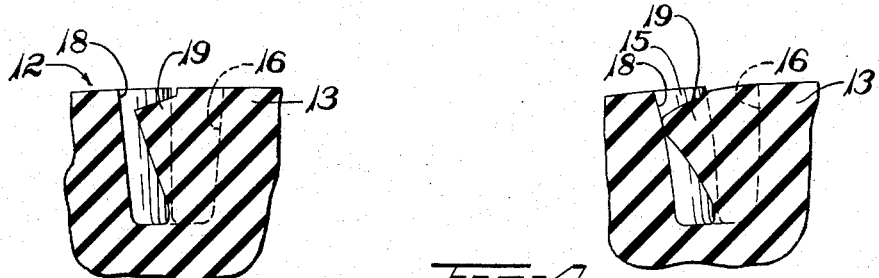

Fig. 3 is an enlarged fragmentary transverse sectional view of one portion of the tread of the tire shown in Fig. 1, the section being taken substantially on the section indicating line 3—3 of Fig. 1 and illustrating the positions of adjacent tread elements under no load condition; and Fig. 4 is a transverse view similar to Fig. 3 but showing the deflection of the tread elements under operating conditions.

A tire incorporating the principles of this invention is constructed in the conventional manner by superposing plies 10 of rubberized cords to form a carcass over which is placed a quantity of rubber tread stock 11, the assembly then being cured in a mold which has a circumferential configuration productive of a tread pattern 12 on the periphery of the tread stock 11. As is well known in the art, the cords in each ply are parallel and extend diagonally relative to the longitudinal center line of the tire with the direction of the cords in adjacent plies alternating. This angle, measured at the crown of the tire and designated C in Fig. 1, may be in the order of 30° to 37° in conventional tires. Tires employing cord angles of this order are relatively stable but do not have a large amount of radial flexibility and hence are stiff and hard riding.

The cords of each of the plies 10 in a tire carcass embodying the principles of this invention form an angle C with the longitudinal center line which is greater than 37° and preferably is in the order of 40° to 45°. This increased cord angle provides a greater cushioning effect by virtue of greater radial flexibility and hence results in a softer and more comfortable ride in a vehicle equipped with tires of this nature. The increase in the cord angle, without other changes, would also result in a lessening of the lateral stability of the tires so that it would no longer be as easy to steer the vehicle or to negotiate curves at as high speeds. In accordance with this invention, however, this reduction in lateral stability of the carcass is compensated by a novel tread pattern such that reinforcement is provided therein in a lateral direction so that the tread has increased radial flexibility with retention of, or increase in, its lateral stability.

As shown in the drawings, the preferred form of the tread pattern for a tire embodying this invention comprises a plurality of laterally spaced circumferentially extending tread elements 13 with grooves 14 therebetween. In the illustrated construction, the tread elements are in the form of circumferentially extending ribs, the sidewalls of which have the configuration of a plurality of intersecting arcuate surfaces. The axes of these arcuate surfaces extend approximately perpendicular to the surface of the tread with a convex surface 15 on a sidewall of one rib, comprising one side of a groove 14, being opposite a concave surface 16 on the sidewall of the adjacent rib forming the other side of the groove. Preferably, these arcuate or curved surfaces 15 and 16 are formed as portions of concentric cylinders so that the resulting lateral peaks 17 between the concave surfaces 16 are opposite the lateral recesses 18 in the adjacent rib sidewall, the configuration being such that the width of the groove at the base thereof is substantially uniform throughout the entire circumference of the tire.

The aforementioned increased lateral stability in the tread is provided by lateral projections or buttresses 19 which are formed as enlargements on spaced ones of the peaks 17. The buttress projections 19 are preferably in the form of fragments of cylinders, the axes of which extend at an angle to the axes of the intersecting cylindrical surfaces forming the sidewalls of the ribs 13. The angle of inclination of the projections 19 are such that the upper free edges thereof extend closely adjacent to the intersecting sidewall curves of the opposite side of the groove, while the lower portions of these projections merge with the ribs from which they extend adjacent to the base thereof so that the width of the groove is not narrowed beneath or adjacent to the projections. In the preferred embodiment, the spacing between the outer edges of the projections or buttresses 19 and the adjacent sides of the opposite tread element is such that the said projections or buttresses are in contact with the opposite rib portions when the tire is under load and/or subjected to lateral deflecting forces, see Fig. 4. By way of example, but without limitation thereto, it may be mentioned that, in tires constructed in accordance with this illustrated form of the invention, the space between the upper or outer edges of the enlargements 19 and the adjacent ribs or tread elements is in the order of 0.03 of an inch, while the width of the groove beneath the projections and adjacent to the base of the groove is substantially the same as in the region of the groove where there are no lateral projections.

It will be seen that, by the provision of the enlarged projections or buttresses 19 in the thread pattern, a laterally deflecting force applied to one rib of the tread tends to be transmitted through the said projections or buttresses to the adjacent rib or ribs, thus distributing the deflecting load between the several ribs or tread elements with the result that lateral rigidity of the tire is increased and hence the tire has good stability. That is, a vehicle equipped with such tires will negotiate curves without difficulty and steering of the vehicle is less difficult than when low stability tires are used. This increase in lateral stability is, however, achieved without sacrifice of radial flexibility since the adjacent ribs are not mechanically interconnected. Moreover, the enlargements or buttresses 19 in the tread do not result in the production of any objectionable suction characteristics in the tire since the tread grooves 14 are not closed by the projections or buttresses, it being remembered that the base or lower portion of each groove 14 is of substantially uniform rib width and is continuous throughout the periphery of the tire even when the tread elements have moved under load to bring the projections or buttresses 19 into engagement with the adjacent portions of the rib on the opposite side of the groove.

The inclination of the sidewalls of the enlargements or abutments 19 is an important feature of the invention, because it not only permits molding of the projections or buttresses in the tread pattern without hampering ready removal of the tire from the mold and without injury to the tread elements but, in addition, this inclination permits maintaining the grooves of sufficient width adjacent the bottoms thereof so that cracking therein does not result from flexure of the tire. This cracking of the tread grooves has been a common defect in tires having laterally projecting tread elements which narrow the tread grooves at the bases thereof. It is true that the inclination of the sidewalls of the projections or buttresses 19 requires greater lateral deflection of the ribs, as the tire tread decreases in thickness, before engagement is effected with adjacent ribs. However, it should be remembered that as the thickness of the tread pattern decreases, the relation between the height and width of the tread elements is changing in the direction which provides greater lateral stability and hence the need for increasing or reinforcing that stability is correspondingly reduced. Consequently, a tire of this construction maintains substantially constant lateral stability throughout its life.

In the preferred embodiment, the projections or buttresses 19 are shown as provided on alternate ones of the peaks or projections 17 along one side of a given rib 13 for cooperation with the recesses 18 on the adjacent rib, the center rib being shown as having both side-walls formed of concave portions with spaced projections or buttresses, the projections on one side being circumferentially staggered with respect to the projections on the opposite side. It will be apparent, however, that this configuration of the tire tread is not critical and that the spacing of the enlargements or buttresses 19 may be altered from that shown without departing from the principles of this invention. It will also be evident that the invention is not restricted to use with a tire tread pattern of the type here specifically illustrated and described, since it is not necessary that the tread elements have the sidewalls thereof formed by intersecting cylindrical surfaces. For example, in one form in which the invention may be embodied, the tread elements or ribs may have the sidewalls in the form of arcuate undulations with the projections or buttresses formed by spaced ones of the undulations being of greater amplitude than those adjacent thereto. It is also possible to incorporate the principles of this invention in a tire wherein the sidewalls of the tread elements have configurations other than intersecting arcuate surfaces. For example, these sidewalls may be in the form of serrations with the buttresses or projections provided by spaced ones of the resulting peaks.

It will also be apparent that in order for a tread groove to have substantially uniform width adjacent the bottom thereof when utilizing the lateral stability increasing projections or buttresses, it is not necessary that the said laterally projecting portions of the tread elements be undercut or relieved in the manner indicated in the preferred embodiment. Instead, the opposite sidewall of the tread pattern may be undercut or relieved adjacent to the projections or buttresses 19 and the sidewall of the latter have the same angle relative to the tread surface as that of the sidewall of the rib from which the buttress projects, the width of the tread groove being maintained substantially uniform by the said undercutting of the opposite rib or element. Moreover, although the preferred embodiment of the tire employs both the higher than normal cord angle and the laterally reinforced tread pattern so that the tire has improved cushioning action without loss of radial stability, in some instances, the conventional cord angles may be employed with the improved tread pattern. This provides a vehicle tire having greater than normal lateral stability, although in such a situation the additional cushioning action or softer ride is not present.

The above mentioned and other adaptations and alterations of the principles herein set forth will be readily apparent to those skilled in the art to which the invention pertains and hence the latter is not to be considered as restricted in scope to the details of the preferred embodiment, as here illustrated and described, except as may be required by the spirit and scope of the appended claims.

Having thus described the invention, we claim:

1. A tire having a rubber tread portion comprising a plurality of laterally-spaced circumferentially-extending tread elements constituting ribs with grooves therebetween, at least some of said ribs having a sidewall thereof provided with circumferentially-spaced portions extending laterally therefrom towards the adjacent rib or the opposite side of an intervening groove and approximately into contact with the sidewall of said adjacent rib adjacent to the ground-engaging surface of the latter rib, the greatest lateral extent of said portions being adjacent the ground-engaging surface of the ribs and one of the adjacent rib sidewalls on opposite sides of an intervening groove being relieved on an incline in the region of each projecting portion so that the bottom of the groove is not narrowed by said projecting portions.

2. A tire having a rubber tread portion comprising a plurality of laterally-spaced circumferentially-extending tread elements constituting ribs with grooves therebetween, at least some of said ribs having circumferentially-spaced portions projecting laterally from a sidewall thereof towards the sidewall of the rib on the other side of the groove therebetween and approximately into contact therewith adjacent the ground-engaging surfaces of the ribs, the greatest lateral extent of said portions being adjacent the ground-engaging surface of the ribs and the sidewall of each of said projecting portions being inclined toward the rib from which it projects and merging therewith adjacent to but spaced from the base thereof, whereby the width of said grooves are not narrowed adjacent the bottoms thereof by said portions.

3. A pneumatic tire having a carcass of rubber and cords in which the included angle between each of the carcass cords and the longitudinal center line of the tire is greater than 37°, the said tire being provided with a tread portion surrounding said carcass and united therewith, the said tread portion comprising a plurality of laterally-spaced circumferentially-extending tread elements constituting ribs with grooves therebetween, at least some of said ribs having circumferentially-spaced portions extending laterally therefrom towards the adjacent rib on the opposite side of an intervening groove and approximately into contact with the side wall of said adjacent rib adjacent to the ground-engaging surface of the latter rib, the greatest lateral extent of said portions being adjacent the ground-engaging surface of the ribs and one of the adjacent rib sidewalls on opposite sides of the intervening groove being relieved on an incline in the region of each projecting portion, whereby radial flexure of the tire is increased without loss of lateral stability.

4. A pneumatic tire having a carcass of rubber and cords in which the included angle between each of the carcass cords and the longitudinal center line of the tire is in the order of 40° to 45°, the said tire being provided with a tread portion surrounding said carcass and united therewith, the said tread portion comprising a plurality of laterally-spaced circumferentially-extending tread elements constituting ribs with grooves therebetween, at least some of said ribs having circumferentially-spaced portions extending laterally therefrom towards the adjacent rib on the opposite side of an intervening groove and approximately into contact with the sidewall of said adjacent rib adjacent to the ground-engaging surface of the latter rib, the greatest lateral extent of said portions being adjacent the ground-engaging surface of the ribs and one of the adjacent rib sidewalls on opposite sides of the intervening groove being relieved on an incline in the region of each projecting portion, whereby radial flexure of the tire is increased without loss of lateral stability.

5. A pneumatic tire having a carcass of each of rubber and carcass cords in which the angle of the cords relative to the longitudinal center line of the tire is greater than 37°, the said tire being provided with a tread portion surrounding said carcass and united therewith, the said tread portion comprising a plurality of laterally-spaced circumferentially-extending tread elements constituting ribs with grooves therebetween, at least some of said ribs having circumferentially-spaced portions projecting laterally from a sidewall thereof toward the sidewalls of the adjacent rib and approximately into contact therewith adjacent the ground-engaging surfaces of the ribs, the greatest lateral extent of said portions being adjacent the ground-engaging surface of the ribs and the sidewall of each of said projecting portions being inclined toward the rib from which it projects and merging therewith adjacent to but spaced from the base thereof, whereby radial flexure of the tire is increased without loss of lateral stability.

6. A pneumatic tire having a carcass of each of rubber and carcass cords in which the angle of the cords relative to the longitudinal center line of the tire is in the order of 40° to 45°, the said tire being provided with a tread portion surrounding said carcass and united therewith, the said tread portion comprising a plurality of laterally-spaced circumferentially-extending tread elements constituting ribs with grooves therebetween, at least some of said ribs having circumferentially-spaced portions projecting laterally from a sidewall thereof toward the sidewall of the adjacent rib and approximately into contact therewith adjacent the ground-engaging surfaces of the ribs, the greatest lateral extent of said portions being adjacent the ground-engaging surface of the ribs and the sidewall of each of said projecting portions being inclined toward the rib from which it projects and merging therewith adjacent to but spaced from the base thereof, whereby radial flexure of the tire is increased without loss of lateral stability.

7. A tire having a rubber tread portion comprising a plurality of laterally-spaced circumferentially-extending tread ribs with grooves therebetween, the sidewalls of said ribs being in the form of a plurality of arcuate surfaces the axes of which extend approximately perpendicular to the surface of the tread with a convex surface on a sidewall of a rib comprising one side of a groove being opposite a concave surface on the sidewall of the adjacent rib comprising the other side of that groove, circumferentially-spaced projections extending laterally from one sidewall of a rib towards the sidewall of an adjacent rib in the region of a recess therein formed by the arcuate surfaces thereof, the said projections having their greatest lateral extent adjacent the ground-engaging surfaces of the ribs with the upper portions of the projections approximately contacting the adjacent rib in the vicinity of the ground-engaging surfaces of the ribs and with the sidewall of each of said projecting portions inclined towards the rib from which it projects and merging therewith adjacent to but spaced from the base thereof whereby lateral stability of the ribs is increased without decrease in the width of the grooves at the bottoms of the latter.

8. A tire as defined in claim 7 wherein the carcass beneath the tread includes a plurality of cords extending at an angle relative to the longitudinal center line of the tire with the included angle between each of the carcass cords and said center line being greater than 37°.

9. A tire as defined in claim 7 wherein the carcass beneath the tread includes a plurality of cords extending at an angle relative to the longitudinal center line of the tire, with the included angle between each of the carcass cords and said center line being in the order of 40° to 45°.

10. A tire having a rubber tread portion comprising a plurality of laterally-spaced circumferentially-extending tread ribs with grooves therebetween, the sidewalls of said ribs being in the shape of intersecting cylindrical surfaces the axes of which extend approximately perpendicular to the surface of the tread and with the surfaces on adjacent sidewalls complementary so that the resulting lateral projections on one sidewall of a rib are opposite the lateral recesses in the adjacent rib sidewall, certain of said projections being provided with integral enlargements each in the form of a fragment of a cylinder the axis of which is inclined relative to the axes of the said intersecting cylindrical surfaces with the upper portion of each enlargement extending closely adjacent the sidewall of the adjacent rib for contact therewith adjacent the ground-contacting surface of the latter when the ribs deflect, the lower portion of said enlargement merging with the sidewall of the rib on which the enlargement is provided adjacent to but spaced above the bottom of the groove between adjacent ribs, whereby lateral stability of the ribs is increased without decrease in the width of the grooves at the bottoms of the latter.

11. A pneumatic tire having a carcass of rubber and cords in which the included angle between each of the carcass cords and the longitudinal center line of the tire is greater than 37°, the said tire being provided with a tread portion surrounding said carcass and united therewith, the said tread portion comprising a plurality of laterally-spaced circumferentially-extending tread ribs with grooves therebetween, the sidewalls of said ribs being in the shape of intersecting cylindrical surfaces the axes of which extend approximately perpendicular to the surface of the tread and with the surfaces on adjacent sidewalls complementary so that the resulting lateral projections on one sidewall of a rib are opposite the lateral recesses in the adjacent rib sidewall, certain of said projections being provided with integral enlargements each in the form of a fragment of a cylinder the axis of which is inclined relative to the axes of said intersecting cylindrical surfaces with the upper portion of each enlargement extending closely adjacent the sidewall of the adjacent rib for contact therewith adjacent the ground-engaging surface of the latter when the ribs deflect, the lower portion of each of said enlargements merging with the sidewall of the rib on which the enlargement is provided adjacent to but spaced above the bottom of the groove between adjacent ribs, whereby radial flexure of the tire is increased without loss of lateral stability.

12. A pneumatic tire having a carcass of rubber and cords in which the included angle between each of the carcass cords and the longitudinal center line of the tire is in the order of 40° to 45°, the said tire being provided with a tread portion surrounding said carcass and united therewith, the said tread portion comprising a plurality of laterally-spaced circumferentially-extending tread ribs with grooves therebetween, the sidewalls of said ribs being in the shape of intersecting cylindrical surfaces the axes of which extend approximately perpendicular to the surface of the tread and with the surfaces on adjacent sidewalls complementary so that the resulting lateral projections on one sidewall of a rib are opposite the lateral recesses in the adjacent rib sidewall, certain of said projections being provided with integral enlargements each in the form of a fragment of a cylinder the axis of which is inclined relative to the axes of said intersecting cylindrical surfaces with the upper portion of each enlargement extending closely adjacent the sidewall of the adjacent rib for contact therewith adjacent the ground-contacting surface of the latter when the ribs deflect, the lower portion of each of said enlargements merging with the sidewall of the rib on which the enlargement is provided adjacent to but spaced above the bottom of the groove between adjacent ribs, whereby radial flexure of the tire is increased without loss of lateral stability.

13. A pneumatic tire including a rubber tread portion provided with a tread pattern comprising a plurality of laterally spaced circumferentially-extending tread elements constituting ribs with circumferentially-extending grooves therebetween, circumferentially spaced portions on at least some of said ribs projecting laterally from a sidewall of the latter toward the sidewall of the rib on the other side of the groove therebetween with the greatest lateral extent of said portions being adjacent the ground-engaging surfaces of the ribs, the outer edges of said projecting portions being spaced from the adjacent rib a distance in the order of 0.03 inch and the sidewall of each of said projecting portions inclining towards and merging with the rib from which it projects at a location adjacent to but spaced from the base of the latter, whereby the width of said grooves are not narrowed adjacent the bottoms thereof by said projecting portions.

References Cited in the file of this patent

UNITED STATES PATENTS

| D. 76,617 | Kohsiek | Oct. 16, 1928 |
| 1,428,040 | Kratz | Sept. 5, 1922 |
| 2,265,543 | Overman | Dec. 9, 1941 |
| 2,290,625 | Stein | July 21, 1942 |
| 2,432,630 | Purdy | Dec. 16, 1947 |
| 2,637,362 | Briscoe et al. | May 5, 1953 |
| 2,661,041 | Walsh | Dec. 1, 1953 |
| 2,786,507 | Howe et al. | Mar. 26, 1957 |
| 2,819,751 | Frary et al. | Jan. 14, 1958 |

UNITED STATES PATENT OFFICE
CERTIFICATE OF CORRECTION

Patent No. 2,869,609                                        January 20, 1959

William F. Billingsley et al.

It is hereby certified that error appears in the printed specification of the above numbered patent requiring correction and that the said Letters Patent should read as corrected below.

Column 4, line 7, for "ribgs" read -- ribs --; column 6, lines 23 and 24, claim 5, and lines 42 and 43, claim 6, in each occurrence, should read as shown below instead of as in the patent --

A pneumatic tire having a carcass of
     rubber and cords in which the angle of each
     of the carcass cords relative --.

Signed and sealed this 26th day of May 1959.

(SEAL)
Attest:

KARL H. AXLINE                                                   ROBERT C. WATSON
Attesting Officer                                            Commissioner of Patents